(12) United States Patent
Millar

(10) Patent No.: US 11,008,022 B2
(45) Date of Patent: May 18, 2021

(54) SYSTEMS AND METHODS FOR PROVIDING A SLIP GEAR FOR AN INDUSTRIAL CART

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

(*) Notice: Subject to any disclaimer, the term of this patent is extended or adjusted under 35 U.S.C. 154(b) by 449 days.

(21) Appl. No.: 15/897,770

(22) Filed: Feb. 15, 2018

(65) Prior Publication Data
US 2018/0362055 A1 Dec. 20, 2018

Related U.S. Application Data

(60) Provisional application No. 62/519,308, filed on Jun. 14, 2017, provisional application No. 62/519,304, filed on Jun. 14, 2017.

(51) Int. Cl.
*B61B 13/00* (2006.01)
*B61C 3/00* (2006.01)
(Continued)

(52) U.S. Cl.
CPC ............... *B61B 13/00* (2013.01); *A01G 9/14* (2013.01); *A01G 9/143* (2013.01); *B61C 3/00* (2013.01);
(Continued)

(58) Field of Classification Search
CPC .......... B61B 13/00; B61B 13/02; B61C 3/00; B61C 17/00
(Continued)

(56) References Cited

U.S. PATENT DOCUMENTS 3,099,966 A * 8/1963 Bishop .................. B61B 10/025
104/96
5,924,365 A * 7/1999 Pircher .................. B61C 13/04
105/29.1
(Continued)

FOREIGN PATENT DOCUMENTS

CN 2253735 U 5/1997
CN 204059028 U 12/2014
(Continued)

OTHER PUBLICATIONS

International Search Report & Written Opinion dated May 25, 2018 for International Application No. PCT/US2018/018294 filed on Feb. 15, 2018.

*Primary Examiner* — Jason C Smith
(74) *Attorney, Agent, or Firm* — Dinsmore & Shohl LLP

(57) ABSTRACT

Described herein are systems and methods providing a slip gear for an industrial cart. One embodiment includes a slip gear that includes a track gear for engaging with the track, a stabilizing bar, and a motor gear for engaging with a drive motor and the track gear. The slip gear may also include a stabilizing bar that is rotatably coupled to the track gear and the motor gear. In some embodiments, when the drive motor rotates the motor shaft, the motor gear rotates with the motor shaft to cause rotation of the track gear to propel the industrial cart. In response to an object pushing the industrial cart along the track, the stabilizing bar rotates to disengage the track gear from the track, thereby reducing friction between the industrial cart and the track.

19 Claims, 14 Drawing Sheets

(51) Int. Cl.
*B61C 17/00* (2006.01)
*A01G 9/14* (2006.01)
*A01G 9/20* (2006.01)
*F16H 19/04* (2006.01)

(52) U.S. Cl.
CPC ................ B61C 17/00 (2013.01); *A01G 9/20* (2013.01); *F16H 19/04* (2013.01); *F16H 2019/046* (2013.01)

(58) Field of Classification Search
USPC .......................................... 104/287; 105/29.1
See application file for complete search history.

(56) References Cited

U.S. PATENT DOCUMENTS

| | | | | |
|---|---|---|---|---|
| 5,989,092 A * | 11/1999 | McGowan | ............... | G09F 19/08 40/411 |
| 6,098,550 A * | 8/2000 | Tsuboi | .................... | B61B 13/06 105/127 |
| 6,129,027 A * | 10/2000 | Gauss | .................. | B23Q 1/0009 104/134 |
| 6,220,174 B1 * | 4/2001 | Gudel | .................... | B61B 13/02 105/29.1 |
| 2012/0060414 A1 * | 3/2012 | Olsson | .................. | B65G 25/10 47/65 |
| 2016/0297610 A1 * | 10/2016 | Grosse | .................... | B60M 1/34 |
| 2018/0362055 A1 * | 12/2018 | Millar | .................... | B61B 13/00 |

FOREIGN PATENT DOCUMENTS

| | | |
|---|---|---|
| DE | 3031916 A1 | 3/1982 |
| JP | 2007309467 A | 11/2007 |
| JP | 2012001174 A | 1/2012 |

* cited by examiner

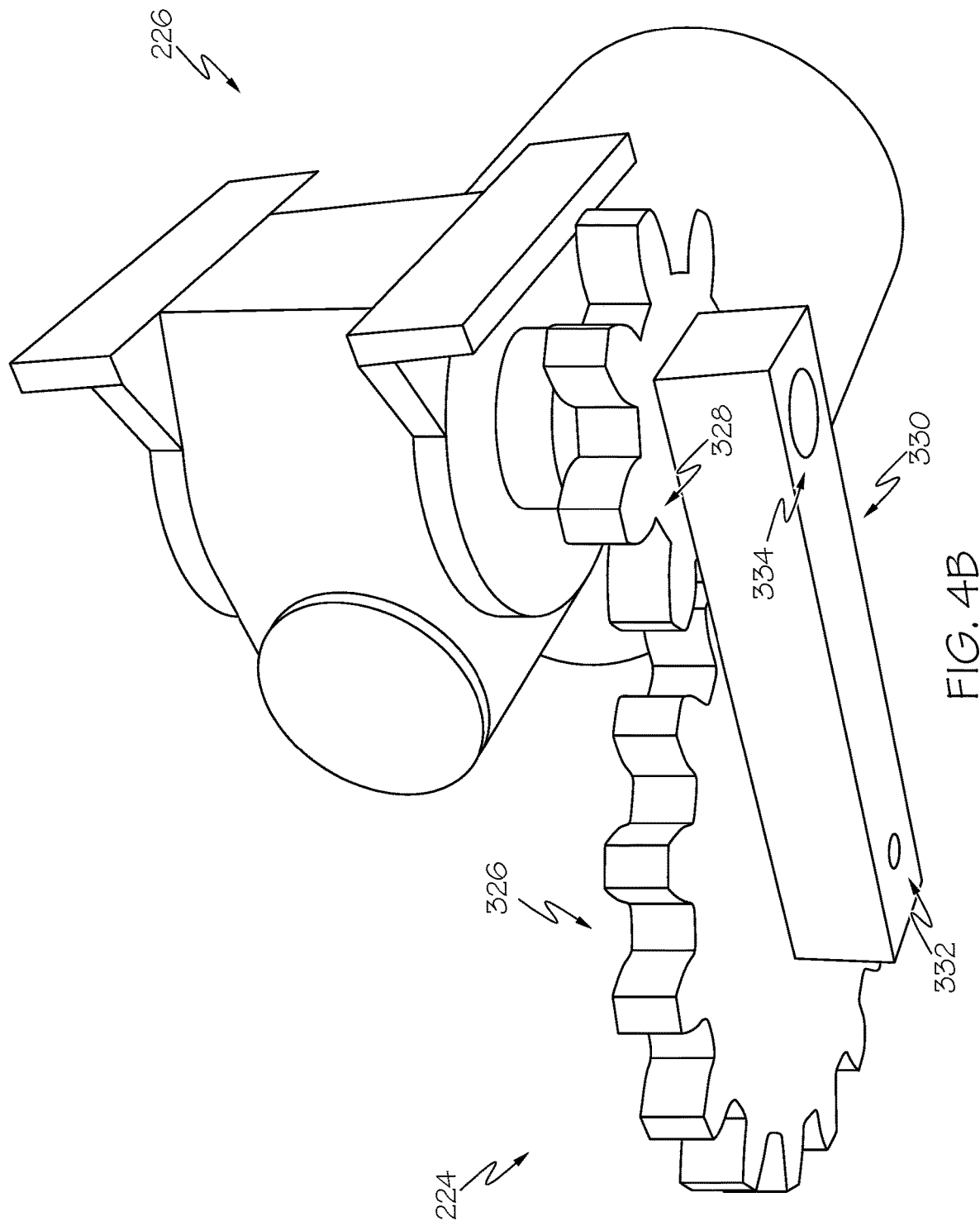

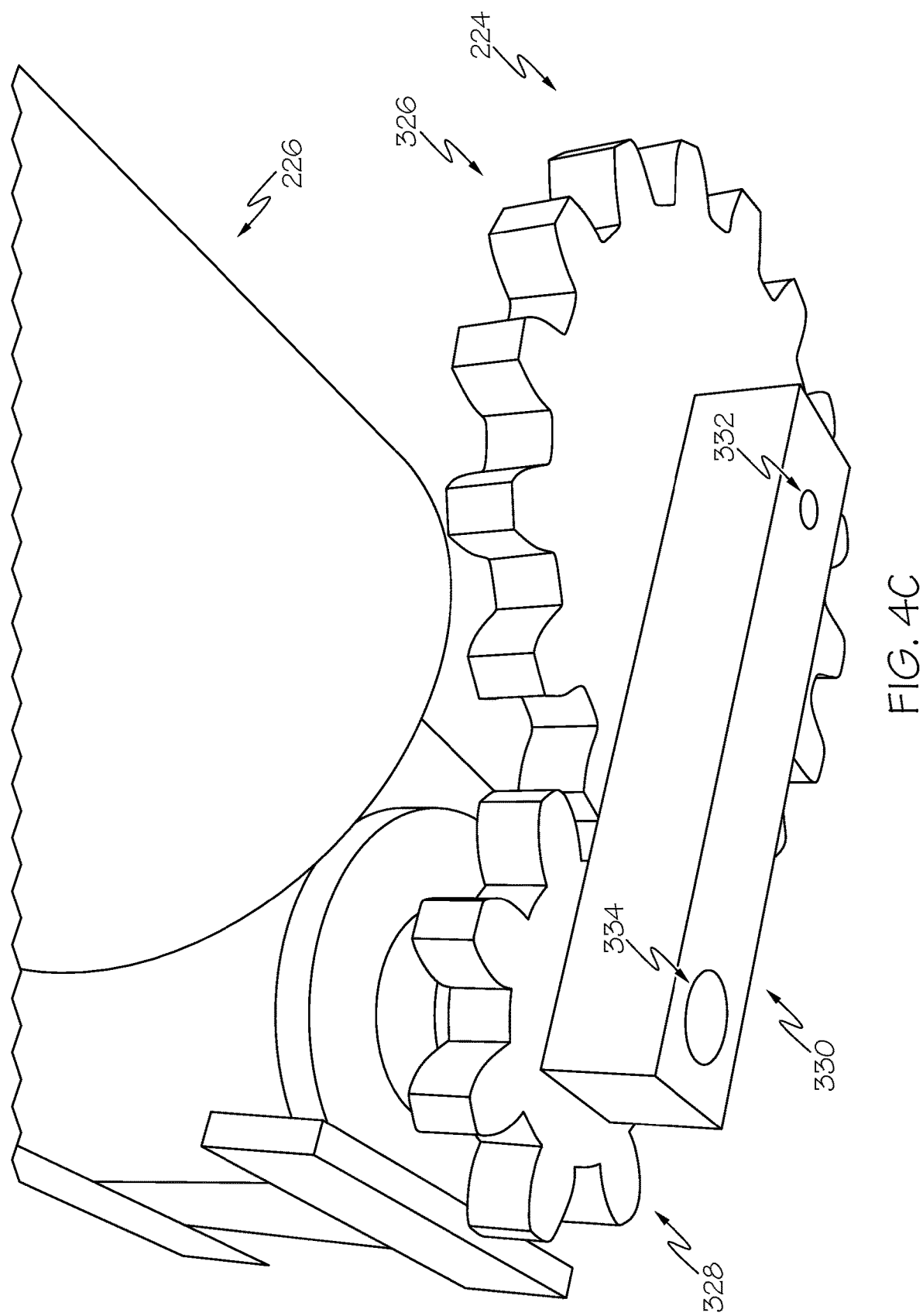

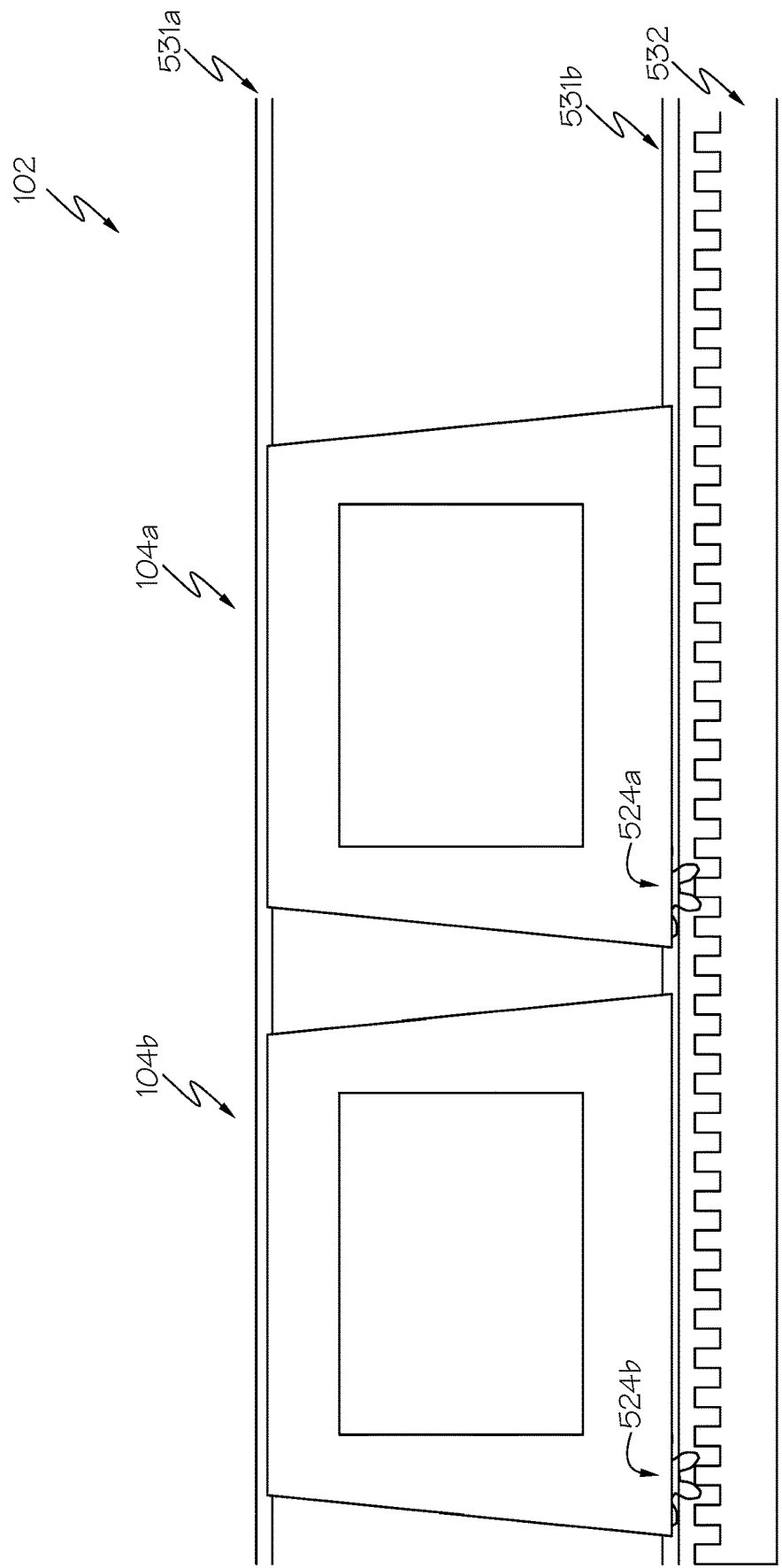

SYSTEMS AND METHODS FOR PROVIDING A SLIP GEAR FOR AN INDUSTRIAL CART

CROSS REFERENCE

This application claims the benefit of U.S. Provisional Application Ser. Nos. 62/519,304 and 62/519,308, both filed on Jun. 14, 2017, the entire contents of which are hereby incorporated by reference in their entireties.

TECHNICAL FIELD

Embodiments described herein generally relate to systems and methods for providing a slip gear for an industrial cart and, more specifically, to providing an industrial cart on an assembly line grow pod that utilizes a slip gear to enable power from an external source.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Additionally many industrial carts, such as those which may be utilized in a grow pod or other industrial environment may be self-powered; powered by a single cart that pulls (or pushes) the remaining carts in the assembly line configuration; powered by a track, etc. However, if power to an industrial cart falters, current solutions do not have the ability to continue moving the failed industrial cart.

SUMMARY

Described herein are systems and methods providing a slip gear for an industrial cart. One embodiment includes a slip gear that includes a track gear for engaging with the track, a stabilizing bar, and a motor gear for engaging with a drive motor and the track gear. The slip gear may also include a stabilizing bar that is rotatably coupled to the track gear and the motor gear. In some embodiments, when the drive motor rotates the motor shaft, the motor gear rotates with the motor shaft to cause rotation of the track gear to propel the industrial cart. In response to an object pushing the industrial cart along the track, the stabilizing bar rotates to disengage the track gear from the track, thereby reducing friction between the industrial cart and the track.

One embodiment of a system includes a drive motor that facilitates propelling of the an industrial cart along a track and slip gear that is coupled to the drive motor, where the slip gear engages a gear of the track to enable the drive motor to propel the industrial cart. In some embodiments, in response to a trailing cart contacting the industrial cart to propel the industrial cart along the track without use of the drive motor, the slip gear disengages from the track to allow the trailing cart to propel the industrial cart along the track.

One embodiment of a slip gear includes a track gear for engaging with a track, a motor gear for engaging with a drive motor of the industrial cart and the track gear, and a stabilizing bar that is coupled to the track gear and the motor gear, where the track gear is also coupled to the motor gear.

In some embodiments, the stabilizing bar defines a motor pass through for receiving a motor shaft of the drive motor. Similarly, some embodiments are configured such that when the drive motor rotates the motor shaft, the motor gear rotates with the motor shaft to cause rotation of the track gear to propel the industrial cart along the track. In some embodiments, in response to the drive motor ceasing rotation and an object contacting a rear surface of the industrial cart to push the industrial cart along the track, the stabilizing bar rotates to disengage the track gear from the track, thereby reducing friction between the industrial cart and the track.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 4A-4D depict a slip gear coupled to a motor, according to embodiments described herein;

FIGS. 5A-5C depict a slip gear on an industrial cart rotating away from a plurality of track teeth, according to embodiments described herein;

DETAILED DESCRIPTION

Embodiments disclosed herein include systems and methods for providing a slip gear for an industrial cart. Some embodiments may be configured to convert rotational energy provided by a motor into linear motion of the cart. In an assembly line configuration, each industrial cart may be independently powered, such that each industrial cart has its own motor or other propulsion mechanism. In these embodiments, the motor may be coupled to a slip gear, which engages with both the motor and the track to convert the rotational motion from the motor into linear motion of the industrial cart.

However, if the motor on the industrial cart fails, embodiments described herein may be configured such that an object, such as a trailing cart can push a rear surface of the industrial cart with the failed motor, thus preventing a stoppage of the assembly line. Some embodiments may be configured such that the pushing motion from the trailing cart causes the slip gear to disengage from the track, thereby reducing friction between the industrial cart and the track. In some embodiments, the industrial cart may include a sensor to determine when the industrial cart is being is being pushed by the object, has malfunctioned, and/or is about to malfunction. These embodiments may be configured to automatically disengage the gear assembly of the industrial cart via electrical power, to reduce friction and allow the trailing cart to push. The systems and methods for providing a slip gear for an industrial cart incorporating the same will be described in more detail, below.

Figure 1:
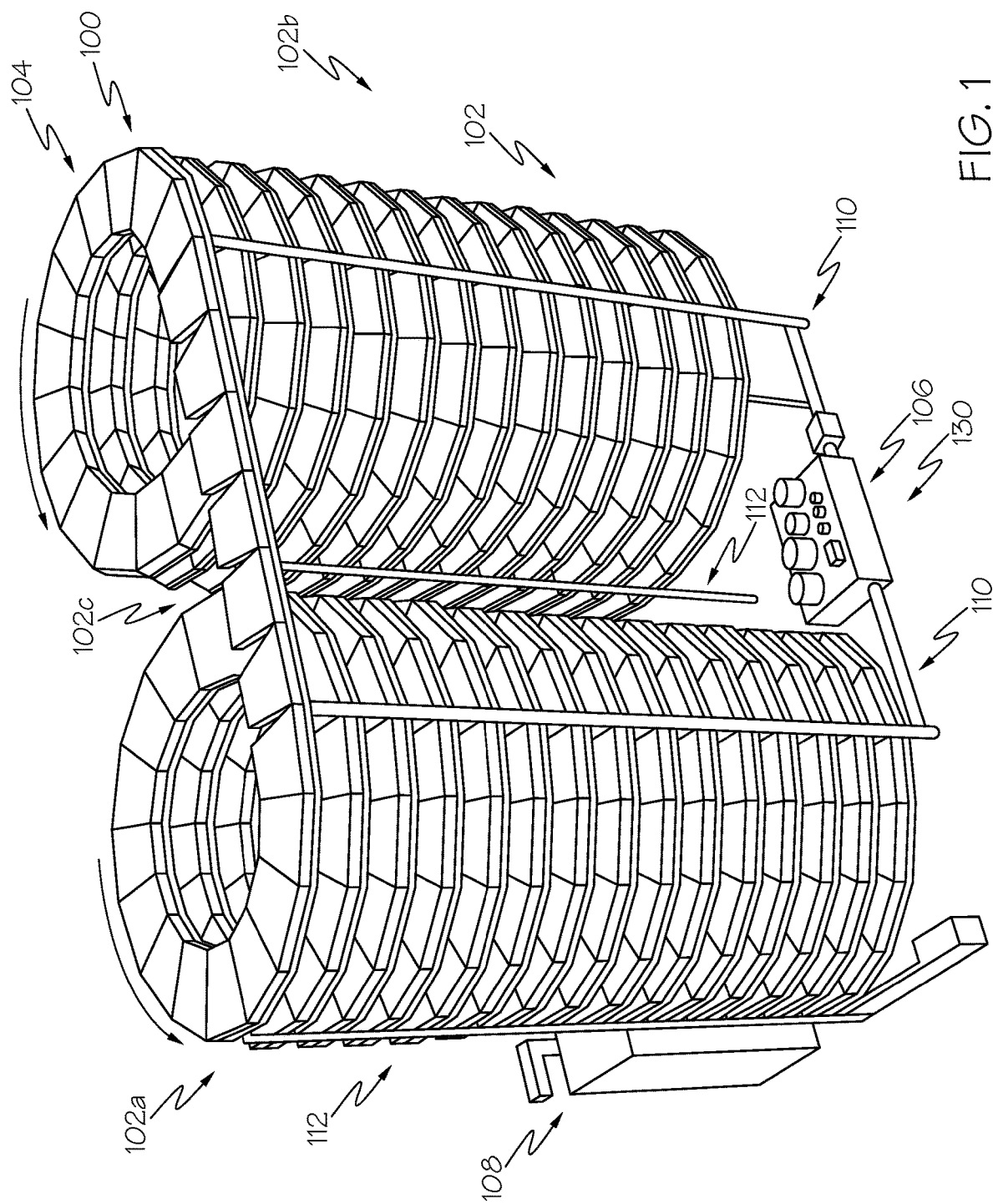
FIG. 1 depicts an assembly line grow pod, according to embodiments described herein.

Referring now to the drawings, FIG. 1 depicts an assembly line grow pod 100, according to embodiments described herein. As illustrated, the assembly line grow pod 100 may be configured to facilitate growth of plants. The assembly line grow pod 100 may include a track 102 that receives at least one industrial cart 104 that may receive one or more seeds and/or plants for growth. The track 102 may include an ascending portion 102a, a descending portion 102b, and a connection portion 102c. At the ascending portion 102a, the track 102 may wrap around (in a counterclockwise direction in FIG. 1) a first axis such that the industrial carts 104 ascend upward in a vertical direction when traversing the track 102. The connection portion 102c may be relatively level (although this is not a requirement) and is utilized to transfer industrial carts 104 to the descending portion 102b. The descending portion 102b may wrap around a second axis (again in a counterclockwise direction in FIG. 1) that is substantially parallel to the first axis, such that the industrial carts 104 may be returned closer to ground level.

While not explicitly illustrated in FIG. 1, the assembly line grow pod 100 may also include a plurality of lighting devices, such as light emitting diodes (LEDs). The lighting devices may be disposed on the track 102 above the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired lighting functionality may be utilized.

Also depicted in FIG. 1 is a master controller 106. The master controller 106 may include a computing device 130 and/or other hardware. As an example, the master controller 106 may include and/or be coupled to a nutrient dosing component, a water distribution component, a seeder component 108, and/or other hardware for controlling various components of the assembly line grow pod 100.

The seeder component 108 may be configured to seed one or more industrial carts 104 as the industrial carts 104 pass the seeder component 108 in the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, pressure, carbon dioxide control, oxygen control, nitrogen control, etc. Accordingly, the airflow lines 112 may distribute the airflow at predetermined areas in the assembly line grow pod 100.

Figure 2:
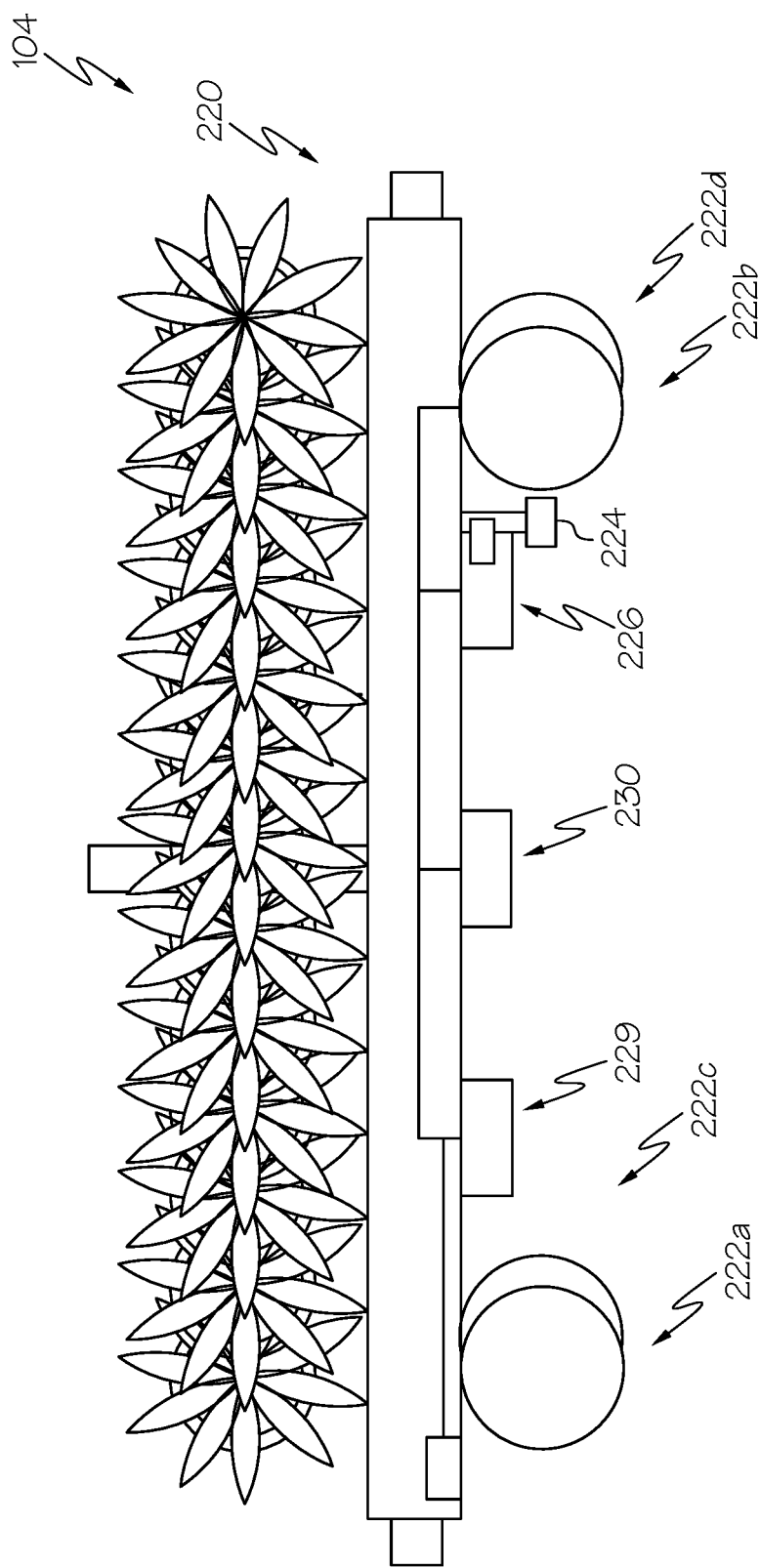
FIG. 2 depicts an industrial cart that may be utilized on an assembly line grow pod or for other industrial purpose, according to embodiments described herein.

FIG. 2 depicts an industrial cart 104 that may be utilized on an assembly line grow pod 100 or for other industrial purpose, according to embodiments described herein. As illustrated, the industrial cart 104 may include a tray section 220, one or more wheels 222a, 222b, 222c, 222d, a slip gear 224, a drive motor 226, a cart computing device 228, and a power supply 229. The tray section 220 may be configured for receiving a payload, such as one or more seeds. The drive motor 226 may be configured for receiving power from the power supply 229 (which may be configured as a battery, capacitor, and/or power supply) and turning the power into rotational energy. The drive motor 226 may additionally be coupled to a slip gear 224, which is also removably coupled to a gear system of the track 102. The slip gear 224 may receive the rotational energy from the drive motor 226 and may transfer that rotational energy to the track 102 for propelling the industrial cart 104 along the track 102. The wheels 222 may also be coupled to the track 102 and, in some embodiments, may receive power for charging the power supply 229 and/or directly powering the drive motor 226 in embodiments that do not utilize a power supply 229 on the industrial cart 104.

It should be understood that while embodiments described herein depict a single drive motor 226 and a single slip gear 224, this is merely one embodiment. Some embodiments may be configured with a plurality of drive motors and/or a plurality of slip gears.

Figure 3A:
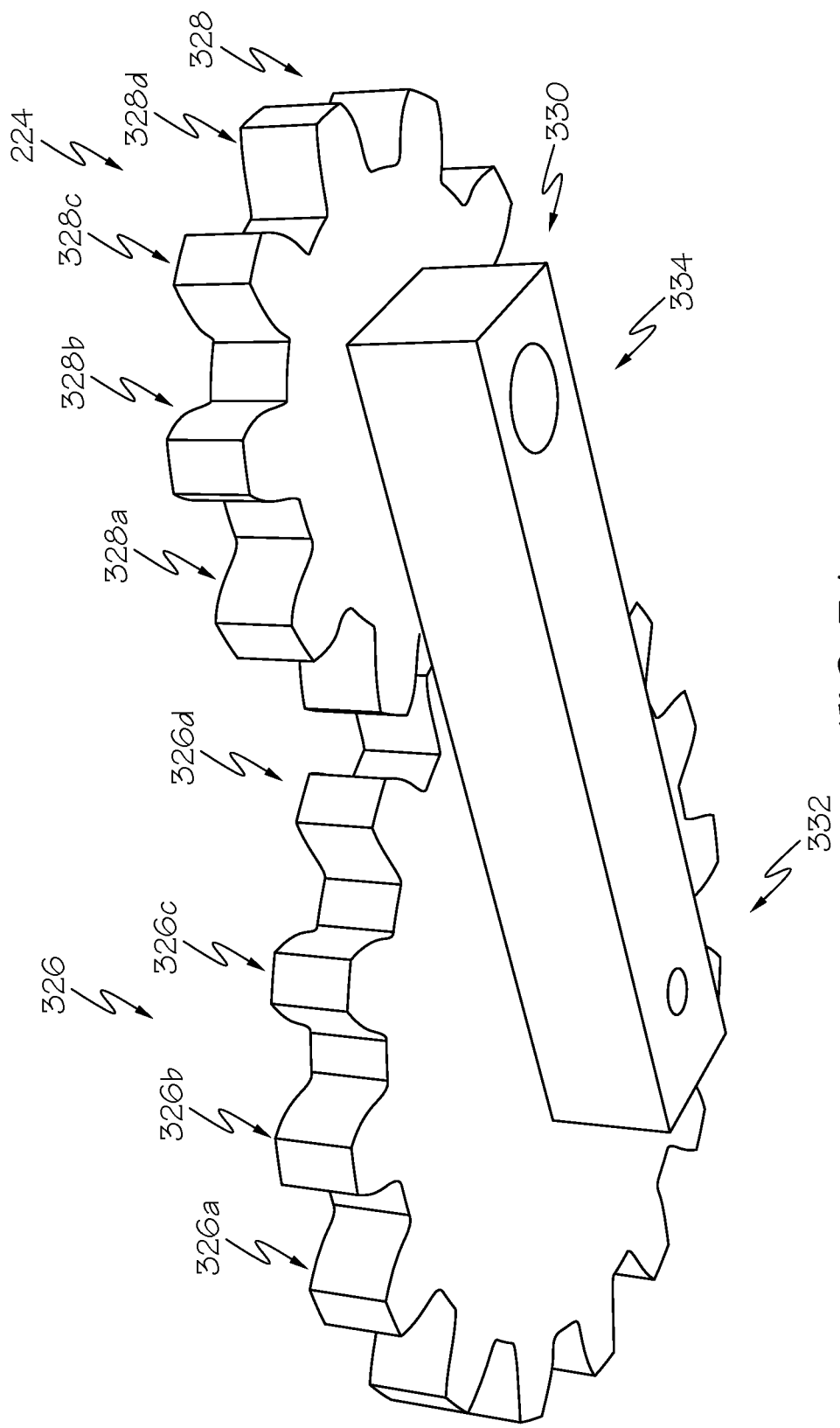
FIGS. 3A, 3B depict a slip gear, according to embodiments described herein.
Figure 3B:
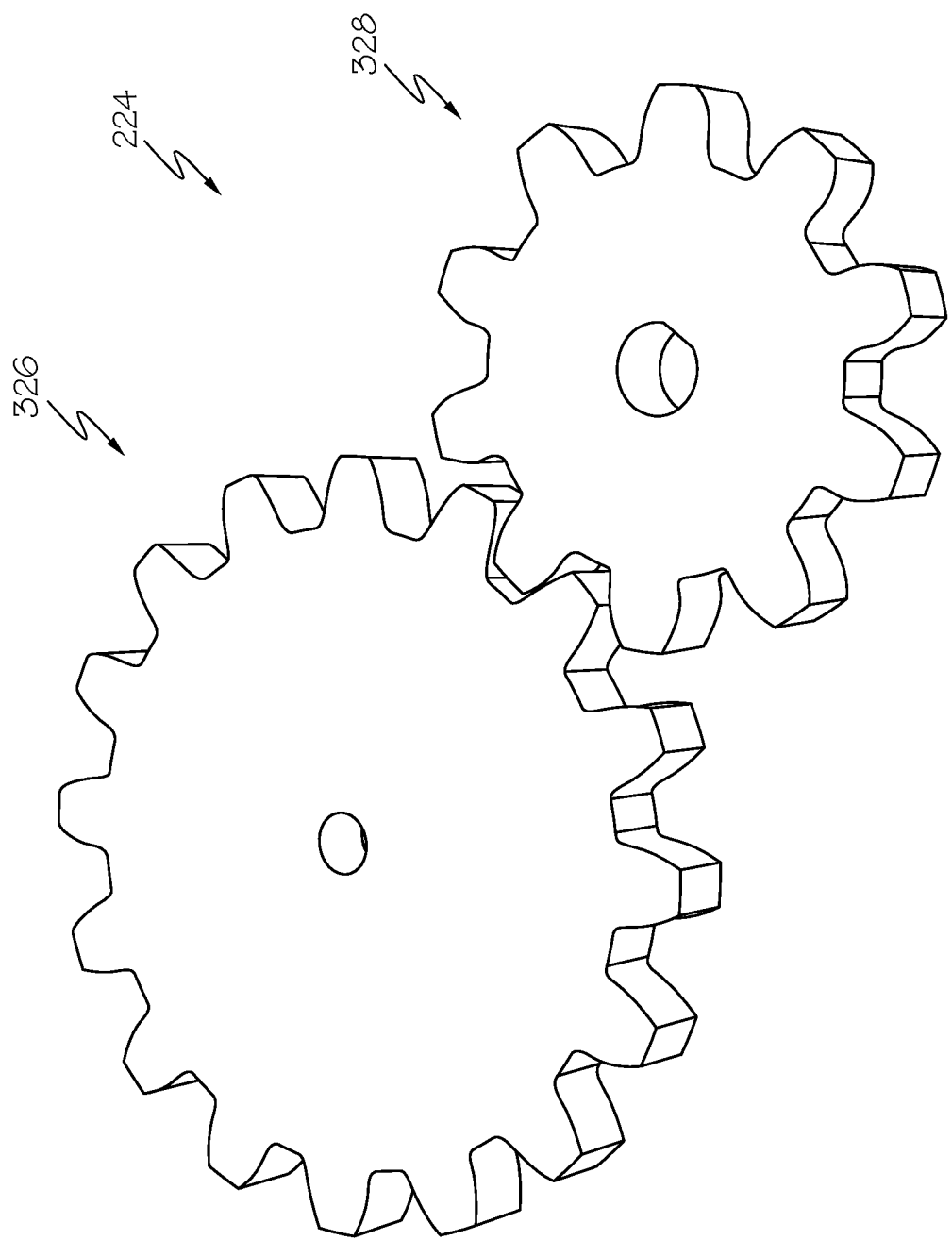

FIGS. 3A, 3B depict a slip gear 224, according to embodiments described herein. As illustrated in FIG. 3A, the slip gear 224 includes a track gear 326 that includes a plurality of track gear teeth 326a-326d and removably couples with the track 102. The slip gear 224 also includes a motor gear 328 that includes a plurality of motor gear teeth 328a-328d, where the motor gear 328 couples with the drive motor 226 (FIG. 3C). The track gear 326 and the motor gear 328 are coupled together (FIG. 4A-4C), such that rotation of the motor gear 328 necessarily imparts rotation into the track gear 326. Also included in the slip gear 224 is a stabilizing bar 330. The stabilizing bar 330 includes a track pass through 332 and a motor pass through 334. The track pass through 332 may receive a shaft from the track gear 326 that rotatably couples the track gear 326 to the stabilizing bar 330. Similarly, the motor pass through 334 may rotatably couple the motor gear 328 to the stabilizing bar 330, as well as receive a motor shaft from the drive motor 226, which rotates the motor gear 328.

It should be understood that while in some embodiments the slip gear 224 and the drive motor 226 are separate components, this is merely one example. Some embodiments utilize an integrated motor slip gear, where the motor gear 328 is integrated into the drive motor 226.

Figure 4A:
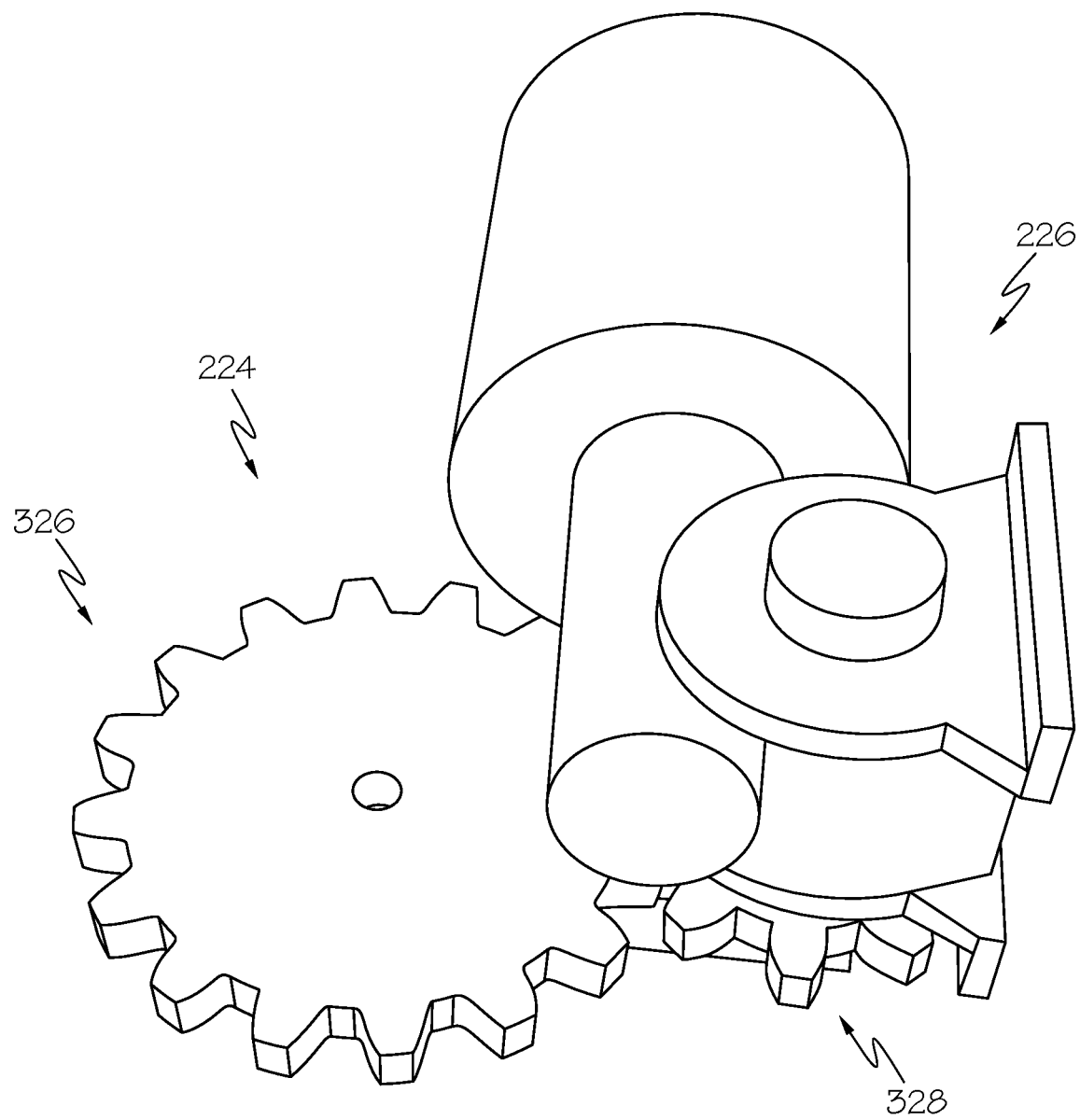

FIGS. 4A-4D depict a slip gear 224 coupled to a drive motor 226, according to embodiments described herein. As illustrated in FIGS. 4A, 4B, and 4C, the drive motor 226 is coupled to the motor gear 328, causing rotation thereof. This rotation causes rotation of the track gear 326. The track gear 326 is coupled to a gear system of the track 102, causing the cart to traverse the track 102.

However, if the drive motor 226 fails, the power supply 229 fails, and/or the industrial cart 104 is otherwise incapacitated, a trailing cart may have an active motor that will cause the trailing cart to collide with and thus push the industrial cart 104 with the drive motor 226 that has stalled. In this situation, the pushing force from the trailing cart causes the slip gear 224 to rotate around the motor pass through 334. This causes rotation of the track gear 326 away from the track gear system, thus disengaging the track gear 326 from the track 102. The disengagement from the track gear 326 system reduces friction between the industrial cart 104 and the track 102, allowing the trailing cart to more easily push the industrial cart 104 until the industrial cart 104 is replaced or repaired.

It should be understood that while some embodiments may utilize physics to naturally rotate the slip gear 224, this is merely one embodiment. Some embodiments may include one or more sensors for determining that the motor and/or cart are disabled and cause the slip gear 224 to disengage from the track gear system through a motorized process. In some of these embodiments, the drive motor 226 may be utilized for this function. In some embodiments however, an additional mechanism may be utilized for this purpose.

Figure 4D:
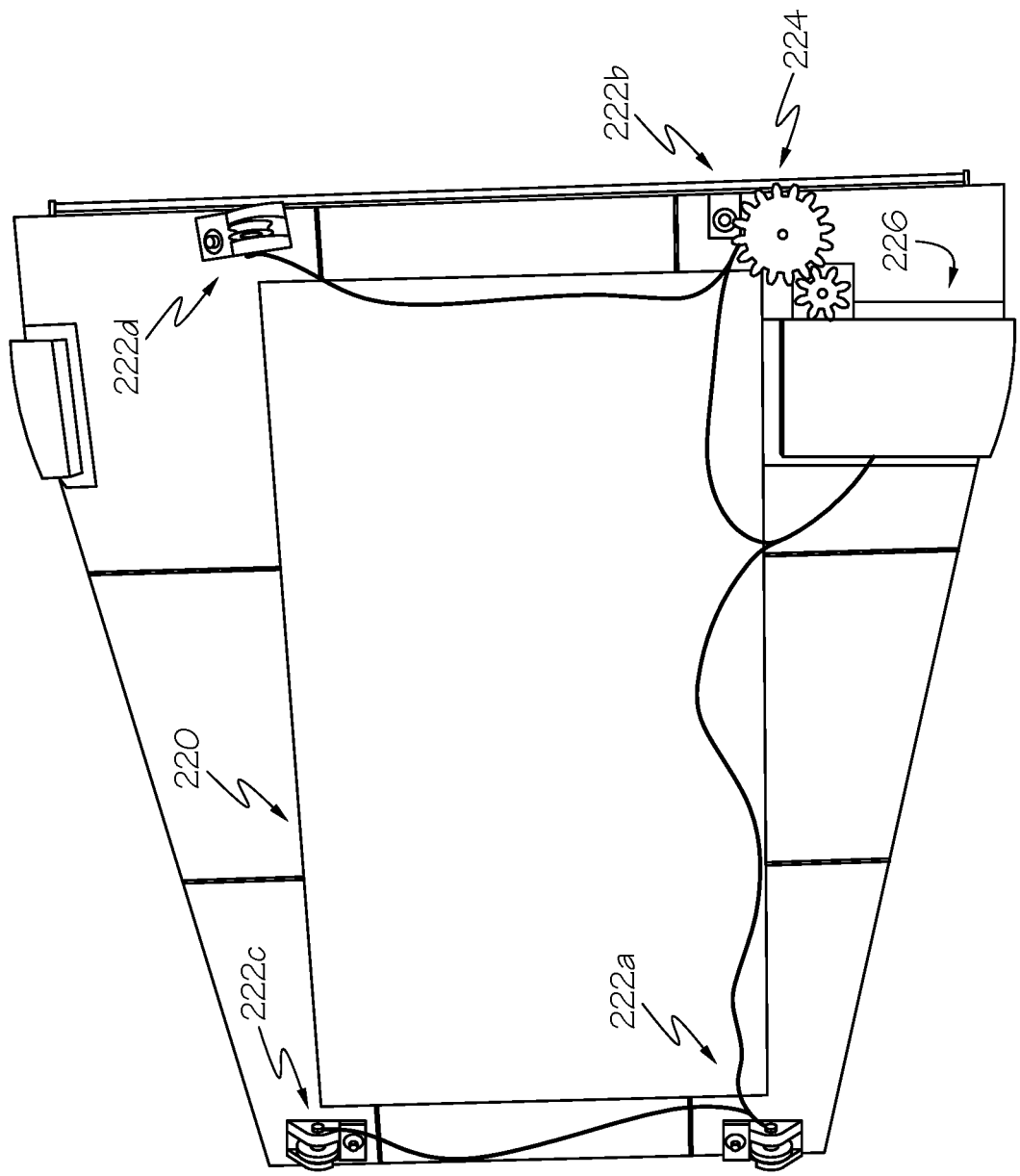

While FIGS. 4A, 4B, and 4C depict various perspectives of the drive motor 226 and the slip gear 224, FIG. 4D depicts the slip gear 224 on the industrial cart 104. As illustrated, the wheels 222 may align and may be configured for coupling with the track 102 (with wheel 222b being hidden from view behind the slip gear 224).

Figure 5B:
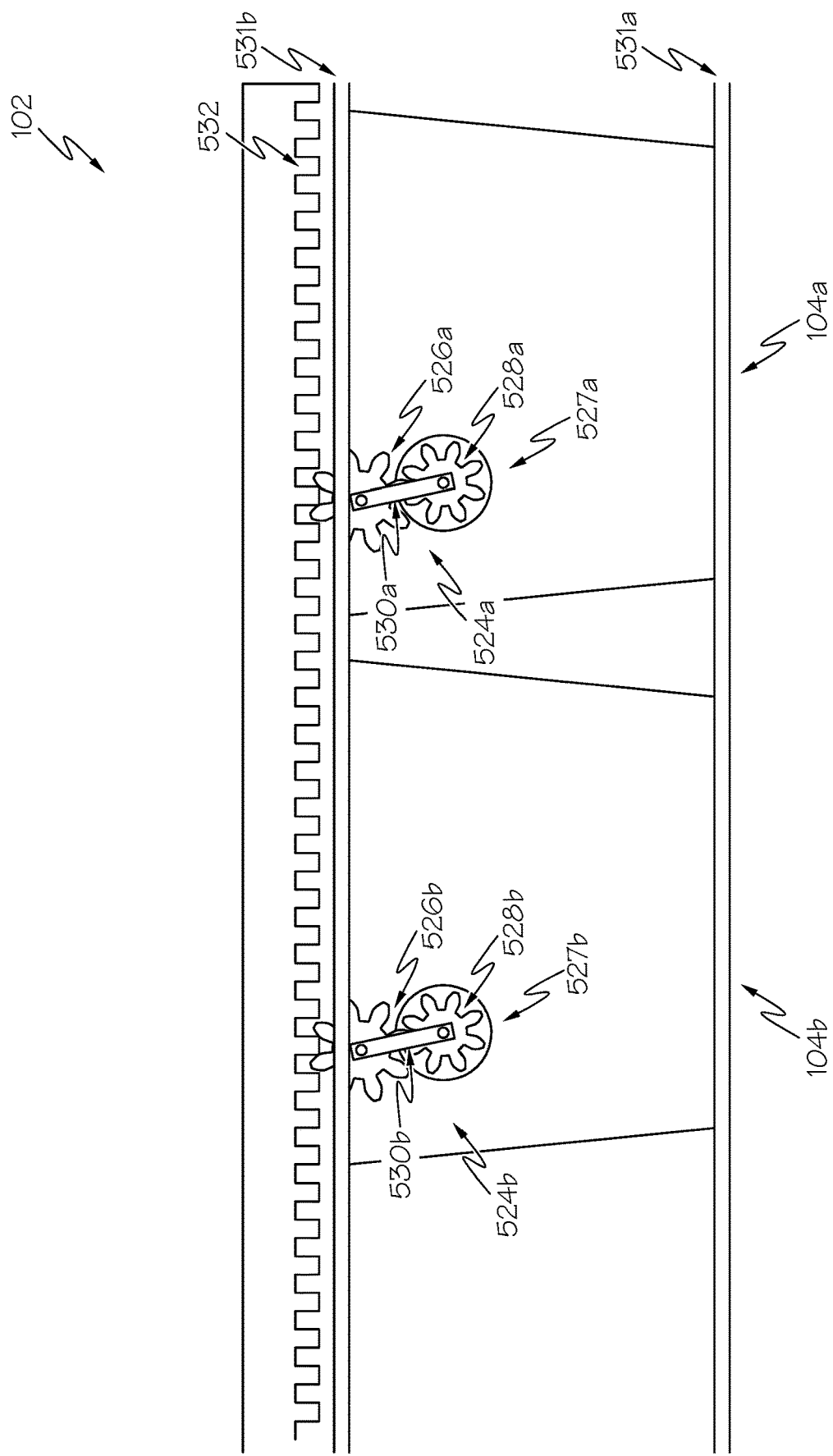
Figure 5C:
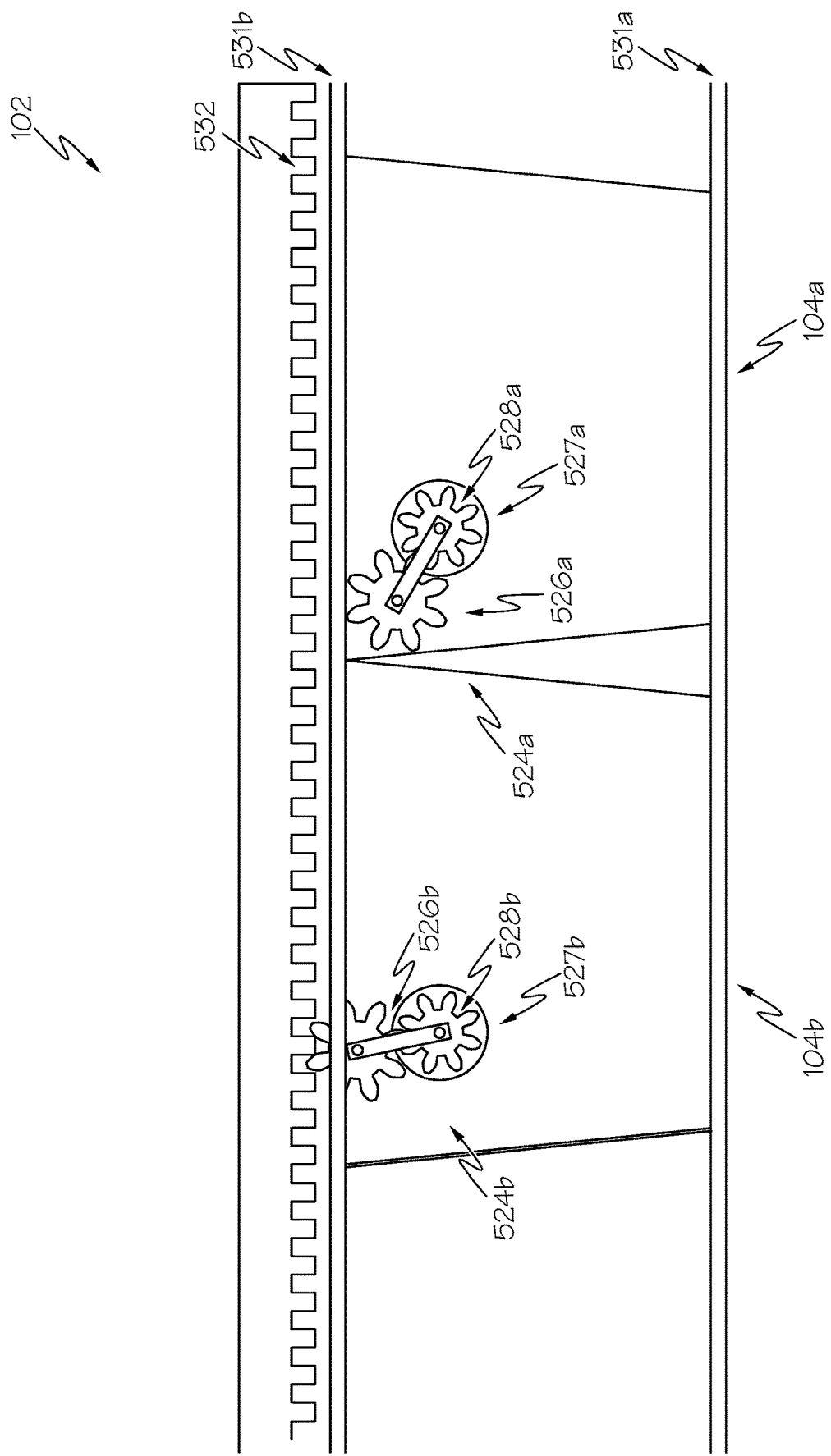

FIGS. 5A-5C depict a slip gear 524a, 524b on an industrial cart 104 rotate away from a plurality of track teeth 532, according to embodiments described herein. As illustrated, the industrial carts 104a, 104b may traverse a track 102 from left to right in FIG. 5A. The track 102 may include a plurality of rails 531a, 531b, to which the wheels 222a-222d (not depicted in FIG. 5A) are engaged. In some embodiments, the track 102 may provide power and/or communication to the industrial carts 104a, 104b. However, in some embodiments, the track 102 may simply guide the industrial carts 104a, 104b in a predetermined path. The track 102 also includes a plurality of track teeth 532 that corresponds with the gear configuration of the slip gear 524a, 524b.

While FIG. 5A depicts an overhead view of the industrial carts 104a, 104b on the track 102, FIG. 5B depicts an underside view. As discussed above, the respective drive motors 527a, 527b may cause rotation of the motor gear 528a, 528b (clockwise in FIG. 5B). The motor gear 528a, 528b thereby causes rotation of the track gear 526a, 526b in the opposite direction, thereby propelling the industrial carts 104a, 104b from right to left in FIG. 5B.

FIG. 5C depicts an underside view of the industrial carts 104a, 104b, with the slip gear 524a disengaged from the track teeth 532. As illustrated, the industrial cart 104a in FIG. 5C incurred a malfunction that caused the industrial cart 104a to stop moving. Because the industrial cart 104b is still moving, the industrial cart 104b physically contacts the industrial cart 104a, thereby pushing the industrial cart 104a along the track 102. In some embodiments, this pushing causes the slip gear 524a to rotate around the motor gear 528a and/or the track gear 526a, causing the track gear 526a to disengage with the track teeth 532. By disengaging from the track teeth 532, reduced friction between the track 102 and the industrial cart 104 results, making it easier for the industrial cart 104b to push the industrial cart 104a.

It should be understood that in the embodiment described above, forces resulting from the described structure of the slip gear 524a and the industrial cart 104b pushing the industrial cart 104a will naturally cause the slip gear 524a to rotate away from the track teeth 532. However, some embodiments may be configured with a powered mechanism to cause this rotation. This powered mechanism may be initiated by the drive motor 527a, another motor, a lever on the track 102, and/or a tension between components of the slip gear 524a, itself.

Returning back to FIG. 5C, if the issue that prevented independent motion of the industrial cart 104 is no longer present, the drive motor 527a may again cause rotation of the motor gear 528a. This rotation causes the track gear 526a to rotate with the motor gear 528a, until engaged with the track teeth 532. Once the track gear 526a engages with the track teeth 532, the friction between the two causes rotation of the track gear 526a in the opposite direction from the rotation of the motor gear 528a. This rotation of the track gear 526a thereby causes motion of the industrial cart 104a along the track 102.

It should be understood that some embodiments may be configured such that the motor gear 528a, the track gear 526a, and the stabilizing bar 530a (labeled in FIG. 5B) each are each configured to freely rotate relative to the each other. However, some embodiments may be configured such that rotation may be limited, such as when the drive motor 527a ceases rotation and/or when the drive motor 527a resumes rotation (but prior to reengaging with the track teeth 532). Such a configuration may be beneficial to more quickly rotate the slip gear 524a into a desired position, based on the state of the industrial cart 104a.

Figure 6:
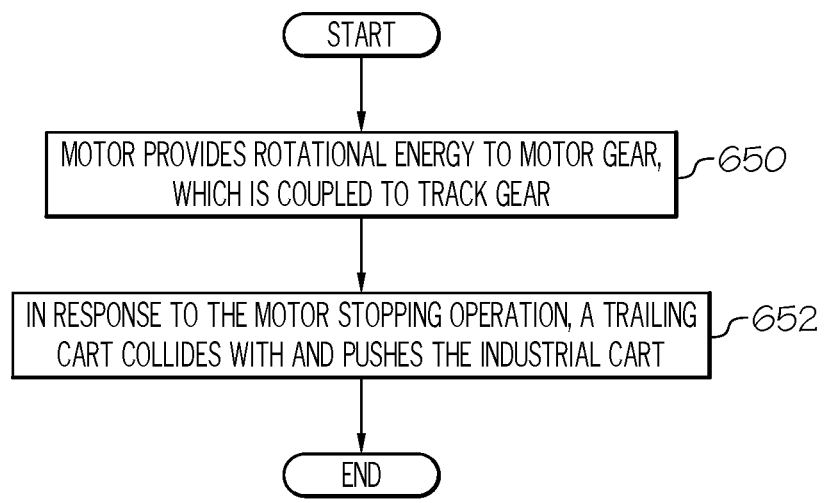
FIG. 6 depicts a flowchart for providing a slip gear for an industrial grow pod.

FIG. 6 depicts a flowchart for providing a slip gear 224 for an assembly line grow pod 100. As illustrated in block 650, a drive motor 226 can provide rotational energy to a motor gear 328, which is coupled to a track gear 326. The rotational energy is passed to the track gear 326, which engages with the track teeth 532, causing an industrial cart 104 to traverse the track 102. In block 652, in response to the drive motor 226 stopping operation, a trailing cart collides with and pushes the industrial cart 104. This pushing causes rotation of the slip gear 224 around a motor pass through on a stabilizing bar 330 on the slip gear 224. This rotation disengages the track gear 326 from the track teeth 532, allowing reduced friction between the industrial cart 104 and the track 102.

It should be understood that while some embodiments described herein may disengage the track gear 326 from the track 102 naturally, this is one example. In some embodiments, the computing device 130 and/or the cart computing device 230 may detect that the drive motor 226 has stopped and may automatically rotate the slip gear 224 to disengage the track gear 326 from the track 102. Similarly, some embodiments may utilize the computing device 130 and/or the cart computing device 230 to detect an issue with the drive motor 226 and/or other cart component and manually disable the industrial cart 104. This disabling may prevent damage and/or other unwanted consequences from the issue.

Figure 7:
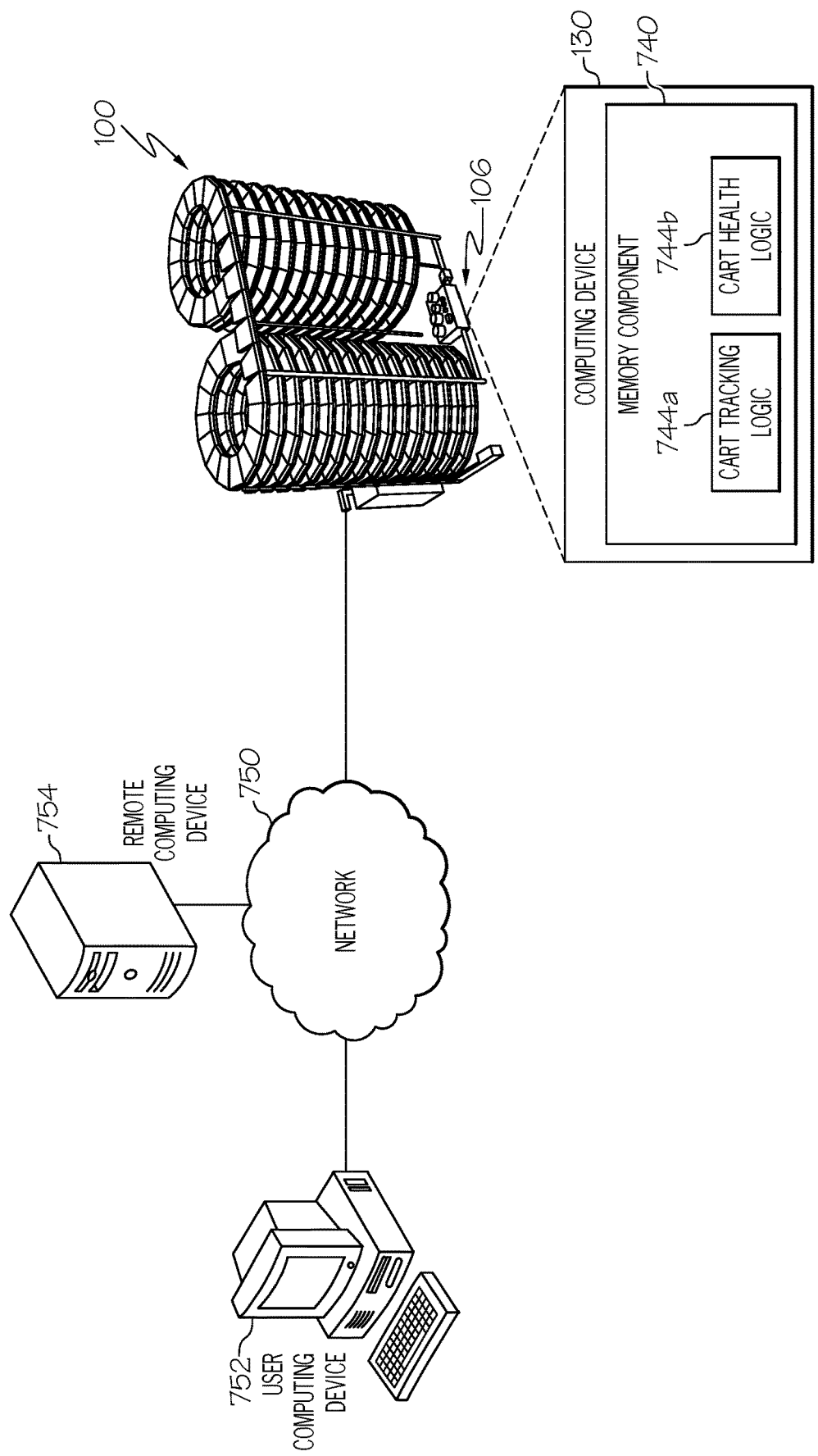
FIG. 7 depicts a computing environment for utilizing a slip gear for an industrial cart.

FIG. 7 depicts a computing environment for utilizing a slip gear 224 for an industrial cart 104. As illustrated, the assembly line grow pod 100 or other track-based assembly for receiving an industrial cart 104 may include and/or be coupled with a master controller 106, which may include a computing device 130. The computing device 130 may include a memory component 740, which stores cart tracking logic 744a and cart health logic 744b. The cart tracking logic 744a may monitor a position of a cart on a track 102. The monitoring may include motor speed, cart speed, cart location, as well as data associated with other carts in the assembly line. The cart health logic 844b may be configured to determine the health of the motor, engagement of the cart with the track 102, and/or other data associated with whether the cart is capable of moving itself without external intervention.

Additionally, the assembly line grow pod 100 or other track-based assembly may be coupled to a network 750. The network 750 may include the internet or other wide area network, a local network, such as a local area network, a near field network, such as Bluetooth or a near field communication (NFC) network. The network 750 is also coupled to a user computing device 752 and/or a remote computing device 754. The user computing device 752 may include a personal computer, laptop, mobile device, tablet, server, etc. and may be utilized as an interface with a user. As an example, a user may send a recipe to the computing device 130 for implementation by the assembly line grow pod 100. Another example may include the assembly line grow pod 100 sending notifications to a user of the user computing device 752.

Similarly, the remote computing device 754 may include a server, personal computer, tablet, mobile device, etc. and may be utilized for machine to machine communications. As an example, if the assembly line grow pod 100 determines a type of seed being used (and/or other information, such as ambient conditions), the computing device 130 may communicate with the remote computing device 754 to retrieve a previously stored recipe for those conditions. As such, some embodiments may utilize an application program interface (API) to facilitate this or other computer-to-computer communications.

It should be understood that while embodiments described herein of an industrial cart 104 and slip gear 224 may operate without the computing environment of FIG. 7, some embodiments may utilize commands from a computing device (such as the computing device 130, the user computing device 752, and/or the remote computing device 754). As an example, if it is determined that an industrial cart 104 is operating, but not optimally, a command may be sent to the industrial cart 104 to shut down the drive motor 226. Once the drive motor 226 is shut down, the industrial cart 104 may be pushed by a trailing cart, thereby rotating the slip gear 224 to disengage with the track teeth 532. Similarly, some embodiments may incur an issue with the slip gear 224, itself (without an issue with the drive motor 226). In such a situation, a command may be sent to rotate the slip gear 224 out of the way by a powered rotation of the slip gear 224 and/or shutting down the drive motor 226.

Figure 8:
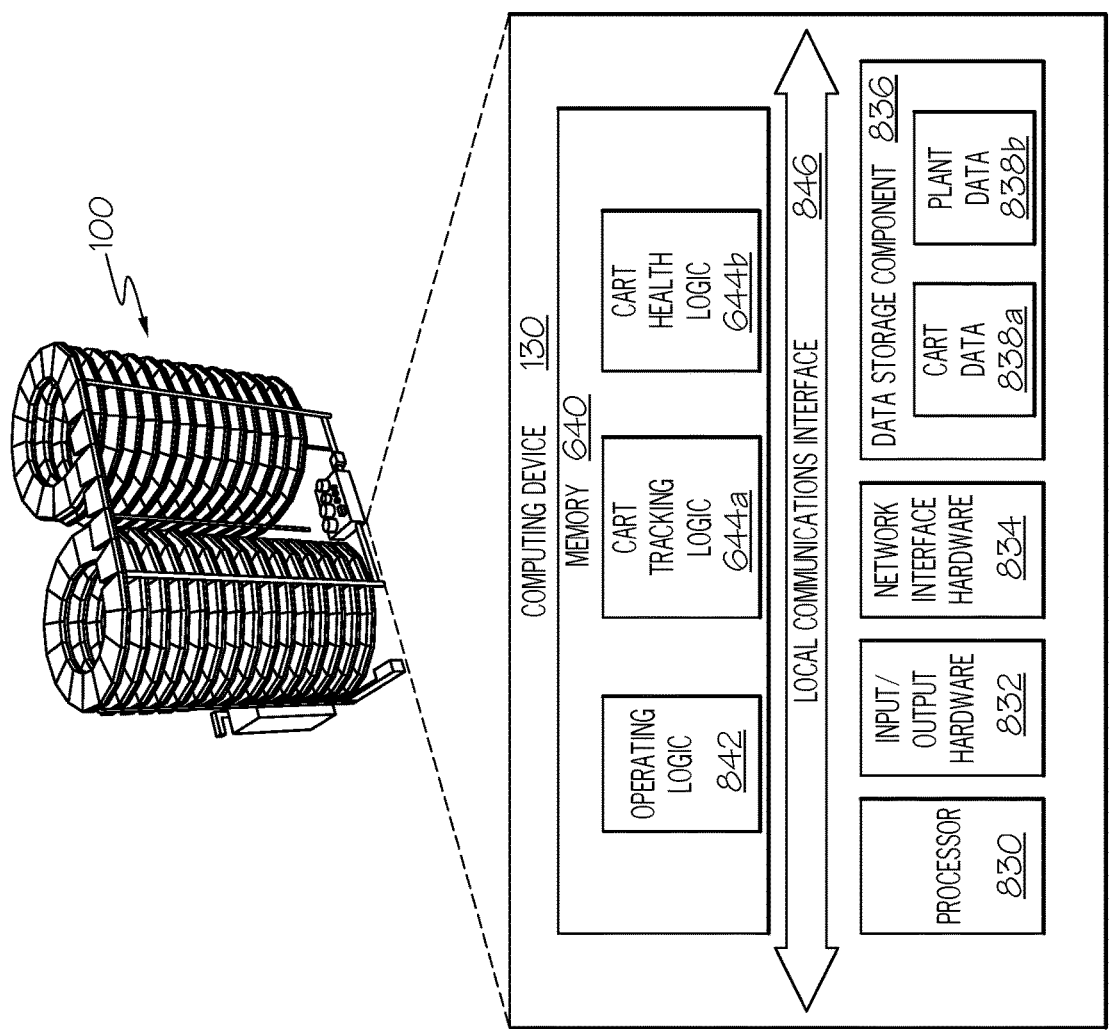
FIG. 8 depicts a computing device for utilizing a slip gear in an industrial cart.

FIG. 8 depicts a computing device 130 for utilizing a slip gear 224 in an industrial cart 104. As illustrated, the computing device 130 includes a processor 830, input/output hardware 832, the network interface hardware 834, a data storage component 836 (which stores systems data 838a, plant data 838b, and/or other data), and the memory component 740. The memory component 740 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 740 may store operating logic 842, the cart tracking logic 744a, and the cart health logic 744b. The cart tracking logic 744a and the cart health logic 744b may each include a plurality of different pieces of logic, each of which may be embodied as a computer program, firmware, and/or hardware, as an example. A local interface 846 is also included in FIG. 8 and may be implemented as a bus or other communication interface to facilitate communication among the components of the computing device 130.

The processor 830 may include any processing component operable to receive and execute instructions (such as from a data storage component 836 and/or the memory component 740). The input/output hardware 832 may include and/or be configured to interface with microphones, speakers, a display, and/or other hardware.

The network interface hardware 834 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 752 and/or remote computing device 754.

The operating logic 842 may include an operating system and/or other software for managing components of the computing device 130. As also discussed above, cart tracking logic 744a and the cart health logic 744b may reside in the memory component 740. As discussed above, some embodiments may utilize the cart tracking logic 744a to determine a position and/or movement of an industrial cart 104 along the track 102. This may include determining whether the industrial cart 104 is adequately traversing the track 102 and utilize this information to determine whether to disengage the slip gear 224 from the track teeth 532. Similarly, the cart health logic 744b may analyze systems and sensors on the industrial cart 104 and determine if the health of the industrial cart 104 would warrant a full or partial shutdown and, thus disengage the slip gear 224.

It should be understood that while the components in FIG. 8 are illustrated as residing within the computing device 130, this is merely an example. In some embodiments, one or more of the components may reside external to the computing device 130, such as on one or more industrial cart 104 (e.g., on the cart computing device 230). It should also be understood that, while the computing device 130 is illustrated as a single device, this is also merely an example. In some embodiments, the cart tracking logic 744a and the cart health logic 744b may reside on different computing devices. As an example, one or more of the functionalities and/or components described herein may be provided by the user computing device 752, the remote computing device 754, and/or the cart computing device 230.

Additionally, while the computing device 130 is illustrated with the cart tracking logic 744a and the cart health logic 744b as separate logical components, this is also an example. In some embodiments, a single piece of logic (and/or or several linked modules) may cause the computing device 130 to provide the described functionality.

As illustrated above, various embodiments for providing a slip gear for an industrial cart are disclosed. Some embodiments provide a plurality of respective slip gears for a plurality of industrial carts. Accordingly, this allows a trailing cart to push the failed cart, allowing the failed cart to function even with a failed motor. This lengthens the useful life of the cart and allows time to repair or replace the malfunctioning components without interrupting other operations.

Accordingly, embodiments provided herein include a system and/or method for providing a slip gear for an industrial cart that includes a motor gear that is coupled to a motor and a stabilizing bar; a track gear that is coupled to the stabilizing bar and removably coupled to a track, wherein the stabilizing bar includes a motor pass through that, when a pushing force at the rear is received at a rear portion of the cart, causes the slip gear to rotate around the motor pass through, thereby disengaging the track bear from the track.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a slip gear for an industrial cart. It should also be understood that these embodiments are merely exemplary and are not intended to limit the scope of this disclosure.

What is claimed is:

1. An industrial cart, comprising:
   a drive motor that facilitates propelling of the industrial cart along a track, wherein the drive motor includes a motor shaft; and
   slip gear, wherein the slip gear comprises:
      a track gear for engaging with the track;
      a motor gear for engaging with the drive motor of the industrial cart and the track gear, wherein the motor gear is physically coupled to the track gear; and
      a stabilizing bar that is rotatably coupled to the track gear and the motor gear,
      wherein the stabilizing bar defines a motor pass through for receiving the motor shaft,
      wherein when the drive motor rotates the motor shaft, the motor gear rotates with the motor shaft to cause rotation of the track gear to propel the industrial cart along the track, and
      wherein in response to the drive motor ceasing rotation and an object contacting a rear surface of the industrial cart to push the industrial cart along the track, the stabilizing bar rotates to disengage the track gear from the track, thereby reducing friction between the industrial cart and the track.

2. The industrial cart of claim 1, wherein the track includes a plurality of track teeth and wherein the track gear includes a plurality of track gear teeth, such that the plurality of track gear teeth engage with the plurality of track teeth to propel the industrial cart along the track.

3. The industrial cart of claim 1, wherein the track is part of an assembly line grow pod and the industrial cart receives at least one of the following: a seed or a plant.

4. The industrial cart of claim 1, further comprising a sensor to determine when the industrial cart is being is being pushed by the object.

5. The industrial cart of claim 1, wherein the stabilizing bar rotates to disengage the track gear from the track via electrical power.

6. The industrial cart of claim 1, wherein the stabilizing bar is freely rotatable respective to the motor gear, such that when the object pushes the industrial cart, the track gear is pushed by the track to automatically disengage from the track.

7. The industrial cart of claim 1, wherein the object includes a trailing cart that is traveling behind the industrial cart on the track.

8. A system, comprising:
   a drive motor that facilitates propelling of the an industrial cart along a track;
   slip gear that is coupled to the drive motor, wherein the slip gear engages a gear of the track to enable the drive motor to propel the industrial cart, and
   an assembly line grow pod that is configured to receive a plurality of industrial carts, wherein at least a portion of the plurality of industrial carts traverse the track to facilitate growth of plants,
   wherein in response to a trailing cart contacting the industrial cart to propel the industrial cart along the track without use of the drive motor, the slip gear disengages from the track to allow the trailing cart to propel the industrial cart along the track.

9. The system of claim 8, wherein the slip gear comprises a track gear, a motor gear, and a stabilizing bar, wherein the stabilizing bar is rotatably coupled to the track gear and the motor gear, wherein the track gear is coupled to the motor gear, wherein when rotation of the drive motor causes the motor gear to rotate, which causes the track gear to rotate, wherein when the track gear is engaged with the track, the rotation of the track gear causes traversal of the industrial cart along the track.

10. The system of claim 9, wherein the track includes a plurality of track teeth and wherein the track gear includes a plurality of track gear teeth, such that the plurality of track gear teeth engage with the plurality of track teeth to propel the industrial cart along the track.

11. The system of claim 9, wherein the stabilizing bar is freely rotatable respective to the motor gear, such that when the trailing cart pushes the industrial cart, the track gear is pushed by the track to automatically disengage from the track.

12. The system of claim 9, wherein the stabilizing bar rotates to disengage the track gear from the track via electrical power.

13. The system of claim 8, further comprising a sensor to determine at least one of the following: when the industrial cart is being is being pushed by the trailing cart, when the industrial cart has malfunctioned, or when the industrial cart is about to malfunction.

14. A slip gear for an industrial cart, comprising:
   a track gear for engaging with a track;
   a motor gear for engaging with a drive motor of the industrial cart and the track gear; and
   a stabilizing bar that is coupled to the track gear and the motor gear, wherein the track gear is also coupled to the motor gear,
   wherein the stabilizing bar defines a motor pass through for receiving a motor shaft of the drive motor, wherein when the drive motor rotates the motor shaft, the motor gear rotates with the motor shaft to cause rotation of the track gear to propel the industrial cart along the track, and wherein in response to the drive motor ceasing rotation and an object contacting a rear surface of the industrial cart to push the industrial cart along the track, the stabilizing bar rotates to disengage the track gear from the track, thereby reducing friction between the industrial cart and the track.

15. The slip gear of claim 14, further comprising the drive motor.

16. The slip gear of claim 14, wherein the track includes a plurality of track teeth and wherein the track gear includes a plurality of track gear teeth, such that the plurality of track gear teeth of the track gear engage with the plurality of track teeth to propel the industrial cart along the track.

17. The slip gear of claim 14, wherein the track gear includes a plurality of track gear teeth and the motor gear includes a plurality of motor gear teeth, wherein the plurality of motor gear teeth engage with the plurality of track gear teeth to propel the industrial cart along the track.

18. The slip gear of claim 14, wherein the track is part of an assembly line grow pod and the industrial cart receives at least one of the following: a seed or a plant.

19. The slip gear of claim 14, wherein the stabilizing bar is freely rotatable respective to the motor gear, such that when the object pushes the industrial cart, the track gear is pushed by the track to automatically disengage from the track.

* * * * *